No. 677,935. Patented July 9, 1901.
L. S. BUFFINGTON.
CARBID CARTRIDGE FOR ACETYLENE GAS GENERATORS.
(Application filed Sept. 10, 1897.)
(No Model.)
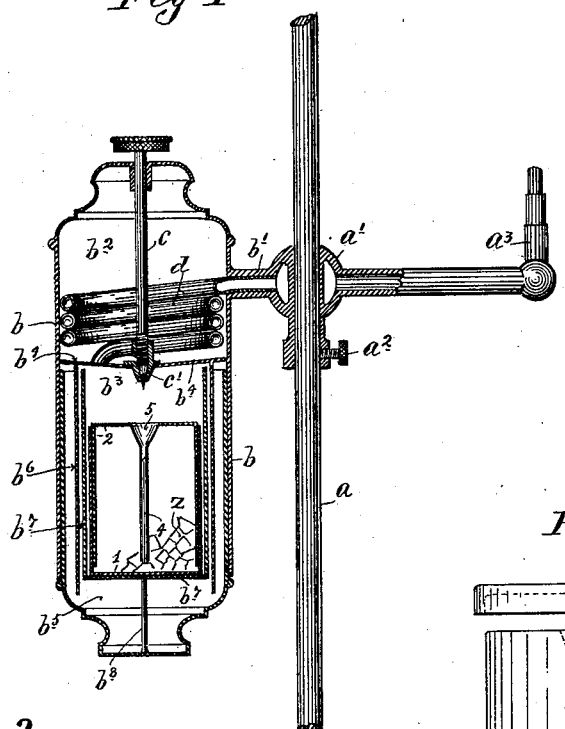
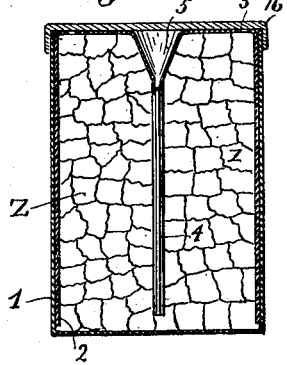
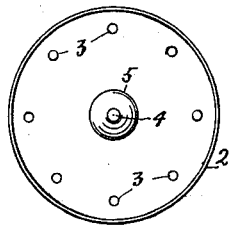
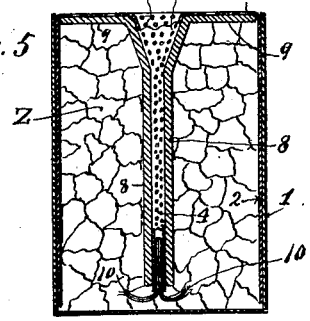
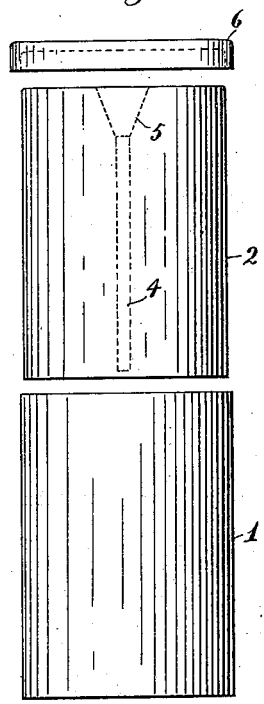
Witnesses.
A. H. Opsahl
C. F. Kilgore
Inventor.
Leroy S. Buffington
By his Attorney.
Jas. F. Williamson
THE NORRIS PETERS CO., PHOTO-LITHO., WASHINGTON, D. C.

UNITED STATES PATENT OFFICE.

LEROY S. BUFFINGTON, OF MINNEAPOLIS, MINNESOTA, ASSIGNOR TO THE BUFFINGTON LIGHT CO., OF WEST VIRGINIA.

CARBID-CARTRIDGE FOR ACETYLENE-GAS GENERATORS.

SPECIFICATION forming part of Letters Patent No. 677,935, dated July 9, 1901.

Application filed September 10, 1897. Serial No. 651,158. (No model.)

*To all whom it may concern:*

Be it known that I, LEROY S. BUFFINGTON, a citizen of the United States, residing at Minneapolis, in the county of Hennepin and State of Minnesota, have invented certain new and useful Improvements in Expansible Carbid-Cartridges; and I do hereby declare the following to be a full, clear, and exact description of the invention, such as will enable others skilled in the art to which it appertains to make and use the same.

My invention relates to expansible charge-holders adapted to be preloaded with carbid and then to be handled as a cartridge for use in acetylene-gas lamps or other generators.

The invention is in the nature of an improvement on the general class of charge-holders first disclosed and broadly claimed by me in my application, Serial No. 642,591, filed June 28, 1897.

As is well known, carbid is a solid gas-producing substance which is used in acetylene-gas generators, such as acetylene-gas lamps and isolated plants. This carbid, which has the property of being almost instantaneously decomposed when brought into contact with water, is, under its strong affinity for water, very rapidly decomposed when exposed to the moisture of the air. When carbid is thus decomposed for the purpose of producing acetylene gas, a residue of lime also results as a by-product. The bulk of this lime or by-product will exceed that of the original bulk of the carbid, or, in other words, under the generating action the bulk of the solid material constantly increases. These properties of carbid make it a peculiarly difficult material to ship from the point of manufacture to the trade at distant points, to be there placed in the generators, without a large waste by premature generation.

It is the object of my present invention to provide an improved expansible charge-holder of very small cost adapted to be preloaded with carbid ready to be applied as a cartridge to the lamp or other generator and adapted to be hermetically sealed, so as to be air and moisture proof, thereby adapting the same to be stored or shipped without loss from the waste or slaking of the carbid.

To the ends above noted my invention consists of the novel devices and combinations of devices hereinafter described, and defined in the claims.

Several forms of my improved carbid cartridge or package are illustrated in the accompanying drawings, wherein, like characters indicating like parts throughout the several views—

Figure 1 is a view, principally in vertical section, but with some parts left in full, showing an acetylene-gas generator in the form of a student's lamp with one of my improved carbid-cartridges placed in position therein. Fig. 2 is a central longitudinal section of one of my improved carbid-cartridges shown as in condition for shipment. Fig. 3 is a view in side elevation showing the parts of the cartridge or shell drawn apart or separated. Fig. 4 is a top or plan view of the cartridge or shell shown in Figs. 1, 2, and 3 with the sealing cap or cover removed; and Fig. 5 is a view corresponding to Fig. 2, illustrating the modified construction.

The lamp shown in the accompanying drawings is intended only to illustrate the ability of the cartridge or shell to serve as a carbid-holder when placed in the generator, and hence the parts of this lamp may be briefly noted.

$a$ indicates the lamp rod or standard, on which a sliding head $a'$ is mounted for vertical movement and is adapted to be held by a set-screw $a^2$. This sliding head $a'$ is hollow and leads to a burner $a^3$.

$b$ indicates the body of the generator, which is supported from the sliding head $a'$ by a short neck $b'$ and is divided into an upper water-containing compartment $b^2$ and into a lower generating-chamber $b^3$ by means of a horizontal dividing-partition $b^4$. The generating-chamber is provided with a telescopically-removable cup-like bottom section $b^5$, which is adapted to contain a sealing liquid, into which the lower end of a cylindrical flange $b^6$, depending from the partition $b^4$, is adapted to be submerged.

$b^7$ indicates a loose cylindrical cup or shell, which, as shown, is supported from the removable bottom $b^5$ by means of a pin $b^8$.

*c* indicates a needle-valve, which works through the top of the generator-shell *b* and is adapted to open and close a feed-passage in a small valve-casting *c'*, located at the center of the partition $b^4$. The generating-chamber $b^3$ is in communication with the hollow sliding head *a'* and burner $a^3$ through a condensing-coil *d*.

1 and 2 indicate a pair of cylindrical cups or sections, which are adapted to telescope one within the other and make up the body of the cartridge or shell. As before stated, these parts are preferably constructed of very light metal. The head of the section 2 is shown as provided with perforations 3 and with a central depending feed-spout 4, the upper portion 5 of which is preferably funnel-shaped. The broken carbid *z* is placed within the cartridge or shell 1 2 around the feed-spout 4. The cartridge is sealed or made air and water tight by means of a sealing cap or cover 6, which is cemented or otherwise secured across the open end of the shell-section 1 and over the perforations 3 and funnel-mouth 5 of the section 2. This sealing-cap 6 is preferably constructed of cardboard or very heavy paper, which is saturated and coated with paraffin to make the same impervious to water.

With the cartridge or shell sealed as above described the carbid may be kept without waste for great lengths of time, and hence may be put up at the carbid factory or works and delivered to the trade without loss of carbid. The consumer may keep a quantity of the cartridges on hand ready for use. Cartridges of different sizes will be supplied for different types of generators. For example, cartridges will be supplied which will fit into the generating-chambers of students' lamps, stand or parlor lamps, bicycle-lamps, or large generators, such as used in a plant for lighting a house. Just before placing the cartridge in the generator the sealing cap or cover 6 must be removed from the cartridge or perforated above the funnel-mouth 5.

When the cartridge above described is placed within the generating-chamber $b^3$ of the student's lamp, as above shown, the funnel-mouth 5 of the feed-tube 4 will stand immediately under the point of the needle-valve *c*, so that when said valve is open water will drop from the water-compartment $b^2$ into said funnel-mouth 5. The water will run from the funnel-mouth 5 through the feed-tube 4 and will be discharged at or in the vicinity of the bottom of the cartridge. In this manner the carbid within the cartridge will be decomposed from the bottom upward. The heat caused by the generation will turn more or less of the water which is brought into contact with the carbid into steam or vapor, which will rise or work its way up into the carbid, and in this manner will thoroughly permeate the carbid within the cartridge. The gas which is generated will also pass upward through the carbid and will find an escape at the upper end of the cartridge through the perforations 3. As the generating action goes on and the lime products increase the bulk of solid material within the cartridge, the cartridge will automatically expand to make room for the same. All this time the cartridge serves the function of a carbid-holder. The shells of the cartridge are preferably made from thin sheet-iron or other cheap metal, but can of course be made of any suitable material adapted to the purpose. It should be some material which is extremely cheap. Hence after the carbid within the cartridge is completely decomposed the cartridge, with the lime residue, may be removed from the generator and thrown away. It is obvious that by the use of the cartridge as above described the generating-chamber is kept clean and the difficulty ordinarily experienced in removing the lime residue from the generating-chamber or carbid-holder is eliminated.

In a modification illustrated in Fig. 5 the construction is very similar to that just described, except that the feed-spout 4 and its funnel-mouth 5 are shown as perforated at 7. The said feed-tube 4 5 is provided with a tubular covering 8, of blotting-paper or other absorbent material, which is flanged at its upper end to form a disk 9, which covers the inner perforated head of the cartridge-section 2.

10 indicates a wick, which extends partly through the feed-tube 4 and has its lower end extending through the lower end of the same and turned outward into contact with the carbid at the bottom of the cartridge. With this construction the absorbent tube 8 serves to conduct moisture laterally from the feed-tube 4 to the carbid, and the wick 10 serves to conduct the water in very finely-divided particles to the carbid at the bottom of the cartridge.

It will be understood that various alterations in the construction above described may be made without departing from the spirit of my invention.

It may be further noted that some of the features disclosed in this case are covered by prior patents issued to me. For example, attention is called to Patent No. 621,217, dated March 14, 1899. It has already been noted that the subject-matter of this case is covered by claims appearing in my pending application, Serial No. 642,591, filed June 28, 1897.

What I claim, and desire to secure by Letters Patent of the United States, is as follows:

1. As a new article of manufacture, a charge-holder for acetylene-gas lamps or other generators, composed of a pair of telescoping cups containing carbid and adapted to be handled as a cartridge, substantially as described.

2. As a new article of manufacture, a charge-holder for acetylene-gas lamps or other generators, composed of a pair of telescoping cups containing carbid, which cups are hermetically sealed and afford an air and moisture proof cartridge for storage and shipment, and serve as an expansible charge-holder when placed in a generator, substantially as described.

3. As a new article of manufacture, a charge-holder for acetylene-gas lamps or other generators, composed of a pair of telescoping cups containing carbid, one member of which cups is provided with a water-feed tube adapted to extend into the carbid, substantially as described.

4. As a new article of manufacture, a charge-holder for acetylene-gas lamps or other generators, composed of a pair of telescoping cups containing carbid, one member of which cups is provided with a perforated water-feed tube extending into the carbid and surrounded by absorbent material, which charge-holder is adapted to be hermetically sealed and afford an air and water proof cartridge, for use substantially as described.

5. As a new article of manufacture, a charge-holder for acetylene-gas lamps or other generators, composed of a pair of telescoping cups containing carbid, a water-feed tube extending from one of said cups into the body of the carbid and provided with a wick of absorbent material, through which the water must be fed to the carbid, which charge-holder is adapted to be hermetically sealed and afford an air and water proof cartridge, for use substantially as described.

In testimony whereof I affix my signature in presence of two witnesses.

LEROY S. BUFFINGTON.

Witnesses:
LILLIAN C. ELMORE,
F. D. MERCHANT.